(12) United States Patent
Lai et al.

(10) Patent No.: US 10,678,369 B2
(45) Date of Patent: *Jun. 9, 2020

(54) TOUCH SENSOR SYSTEM AND MULTIPLEXER THEREOF

(71) Applicant: NOVATEK Microelectronics Corp., Hsin-Chu (TW)

(72) Inventors: Chih-Chang Lai, Taichung (TW); Chih-Yuan Chang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 91 days.

This patent is subject to a terminal disclaimer.

(21) Appl. No.: 16/049,823

(22) Filed: Jul. 31, 2018

(65) Prior Publication Data

US 2018/0364857 A1 Dec. 20, 2018

Related U.S. Application Data

(63) Continuation-in-part of application No. 14/963,257, filed on Dec. 9, 2015, now Pat. No. 10,055,049.

(51) Int. Cl.
*G06F 3/041* (2006.01)
*G06F 3/044* (2006.01)

(52) U.S. Cl.
CPC ........... *G06F 3/0416* (2013.01); *G06F 3/044* (2013.01)

(58) Field of Classification Search
CPC .......... G06F 3/041; G06F 3/044; G06F 3/047; G06F 3/0416; G06F 2203/04103
See application file for complete search history.

(56) References Cited

U.S. PATENT DOCUMENTS

| | | | |
|---|---|---|---|
| 9,478,162 B2 | 10/2016 | Lee | |
| 10,055,049 B2 * | 8/2018 | Lai | ............ G06F 3/047 |
| 2005/0088386 A1 | 4/2005 | Kao | |
| 2007/0097018 A1 | 5/2007 | Yamamoto | |
| 2007/0176184 A1 | 8/2007 | Lee | |
| 2009/0273573 A1 * | 11/2009 | Hotelling | ............ G06F 3/0362 345/173 |
| 2012/0105355 A1 * | 5/2012 | Souchkov | ............ G06F 3/0416 345/174 |
| 2012/0154327 A1 | 6/2012 | Liu | |
| 2013/0176318 A1 | 7/2013 | Dunn | |
| 2014/0022185 A1 * | 1/2014 | Ribeiro | ................ G06F 3/0412 345/173 |

(Continued)

*Primary Examiner* — Ricardo Osorio
(74) *Attorney, Agent, or Firm* — Winston Hsu

(57) ABSTRACT

A touch sensor system includes a touch panel, at least one multiplexer and a touch controller. The touch panel includes one or more touch sensing areas. The at least one multiplexer is coupled to the one or more touch sensing areas through one or more connecting wire groups on the touch panel, wherein each of the connecting wire groups includes one or more connecting wires. The touch controller is coupled to the at least one multiplexer via one or more touch control wires and one or more touch sensing wires. Each of the at least one multiplexer includes one or more switch groups each coupled between one of the one or more touch sensing wires and one of the connecting wire groups, and each of the switch groups includes one or more switches respectively controlled by one or more control signals transmitted through the one or more touch control wires.

35 Claims, 13 Drawing Sheets

(56) References Cited

U.S. PATENT DOCUMENTS

| | | | |
|---|---|---|---|
| 2014/0152930 A1 | 6/2014 | Lin | |
| 2014/0184313 A1* | 7/2014 | Chuang | G06F 3/044 |
| | | | 327/517 |
| 2014/0292704 A1* | 10/2014 | Cleary | G06F 3/044 |
| | | | 345/174 |
| 2014/0306925 A1* | 10/2014 | Yeh | G06F 3/0416 |
| | | | 345/174 |
| 2015/0030217 A1* | 1/2015 | Wickboldt | G06K 9/00026 |
| | | | 382/124 |
| 2015/0035797 A1 | 2/2015 | Shahparnia | |
| 2015/0109357 A1 | 4/2015 | Nakai | |
| 2016/0240117 A1 | 8/2016 | Xu | |
| 2017/0098421 A1 | 4/2017 | Son | |
| 2017/0123568 A1* | 5/2017 | Takeda | G06F 3/0416 |

* cited by examiner

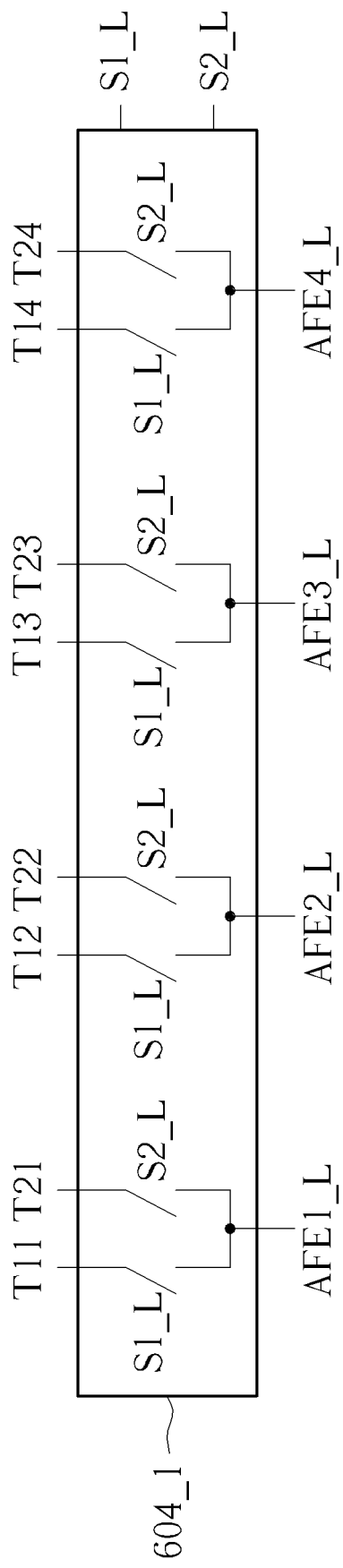
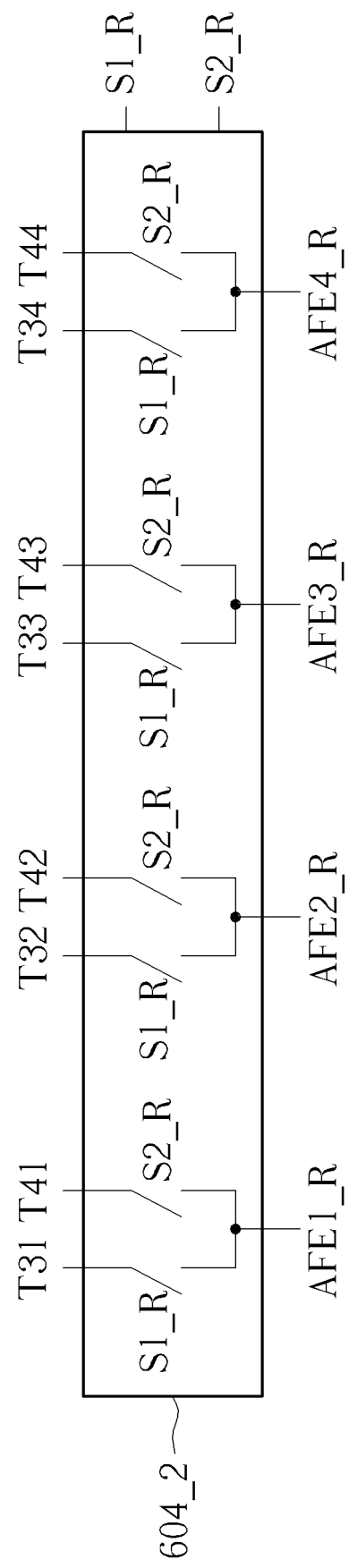
FIG. 7A
FIG. 7B

TOUCH SENSOR SYSTEM AND MULTIPLEXER THEREOF

CROSS REFERENCE TO RELATED APPLICATIONS

This application is a continuation-in-part application of U.S. application Ser. No. 14/963,257, filed on Dec. 9, 2015, the contents of which are incorporated herein by reference.

BACKGROUND OF THE INVENTION

1. Field of the Invention

The present invention relates to a touch sensor system and a multiplexer thereof, and more particularly, to a multiplexer capable of reducing a pin number of a touch controller in the touch sensor system.

2. Description of the Prior Art

In recent years, the touch sensing technology advances rapidly, and many consumer electronic products such as mobile phones, GPS navigator systems, tablets, personal digital assistants (PDA) and laptops are equipped with touch sensing functions. A conventional touch sensor system is composed of a touch panel and a touch integrated circuit (IC). The touch IC is capable of transmitting driving signals to the touch panel and correspondingly receiving sensing signals from touch sensing areas on the touch panel.

Please refer to FIG. 1, which is a schematic diagram of a general touch sensor system 10. As shown in FIG. 1, the touch sensor system 10 includes a touch panel 100 and a touch IC 102. The touch panel 100 includes 9 touch sensing areas arranged in a 3×3 array. Each touch sensing area is connected to the touch IC 102 via a connecting wire and a contact. In such a situation, the touch IC 102 should include at least 9 I/O pins for connecting with the touch sensing areas.

However, as the commercial requirements of larger touch panels increase, the number of touch sensing areas on a touch panel increases with the size of the touch panel. To date, there may be hundreds or thousands of touch sensing areas on a touch panel. For example, in a touch panel having touch sensing areas arranged in a 32×18 array, there are 576 touch sensing areas on the touch panel. In such a situation, the touch IC should include at least 576 I/O pins for connecting with the touch sensing areas. The large number of I/O pins significantly increases the die size of the touch IC, and thus increases the cost. The wire bonding quality is also reduced since the bonding pitch is limited. Thus, there is a need for improvement over the prior art.

SUMMARY OF THE INVENTION

It is therefore an objective of the present invention to provide a multiplexer disposed between the touch controller and the touch panel, to reduce the pin number of the touch controller.

An embodiment of the present invention discloses a touch sensor system, which comprises a touch panel, at least one multiplexer and a touch controller. The touch panel comprises one or more touch sensing areas. The at least one multiplexer is coupled to the one or more touch sensing areas through one or more connecting wire groups on the touch panel, wherein each of the one or more connecting wire groups comprises one or more connecting wires. The touch controller is coupled to the at least one multiplexer via one or more touch control wires and one or more touch sensing wires. Each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

Another embodiment of the present invention discloses a multiplexer used in a touch sensor system, wherein the multiplexer is coupleable to a touch controller via one or more touch control wires and one or more touch sensing wires, and the multiplexer is coupleable to a touch panel through one or more connecting wire groups. Each of the one or more connecting wire groups comprises one or more connecting wires, and the multiplexer comprises one or more switch groups each coupled between one of the touch sensing wires and one of the one or more connecting wire groups. Each of the switch groups comprises one or more switches, each of which comprises a first connection terminal, a second connection terminal and a control terminal. The first connection terminal is coupled to the touch controller via one of the one or more touch sensing wires. The second connection terminal is coupled to the touch panel, and the touch panel comprises one or more touch sensing areas. The control terminal is coupled to one of the one or more touch control wires, for receiving one of one or more control signals from the touch controller. The one or more switches in each of the switch groups are respectively controlled by one or more control signals transmitted through the touch control wires.

Another embodiment of the present invention discloses a multiplexer used in a touch sensor system, wherein the multiplexer is coupleable to a touch controller via one or more touch control wires and one or more touch sensing wires, and the multiplexer is coupleable to a touch panel through one or more connecting wire groups. Each of the one or more connecting wire groups comprises one or more connecting wires, and the multiplexer comprises one or more switch groups each coupled between one of the touch sensing wires and one of the one or more connecting wire groups. Each of the switch groups comprises one or more switches, each of which comprises a first connection terminal, a second connection terminal and a control terminal. The first connection terminal is coupled to the touch controller via one of the one or more touch sensing wires. The second connection terminal is coupled to the touch panel, and the touch panel comprises one or more touch sensing areas. The control terminal is coupled to one of the one or more touch control wires, for receiving one of one or more control signals from the touch controller.

Another embodiment of the present invention discloses a touch sensor device, which comprises at least one multiplexer and a touch controller. The at least one multiplexer is configured to be coupled to one or more touch sensing areas of a touch panel through one or more connecting wire groups on the touch panel, wherein each of the one or more connecting wire groups comprises one or more connecting wires. The touch controller is configured to be coupled to the at least one multiplexer via one or more touch control wires and one or more touch sensing wires. Each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

Another embodiment of the present invention discloses a touch panel apparatus, which is configured to be controlled by a touch controller and comprises a touch panel and at least one multiplexer. The touch panel comprises one or more touch sensing areas. The at least one multiplexer is coupled to the one or more touch sensing areas through one or more connecting wire groups on the touch panel, wherein each of the one or more connecting wire groups comprises one or more connecting wires. Each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

Another embodiment of the present invention discloses a touch controller, which is configured to control a touch panel apparatus comprising a touch panel comprising one or more touch sensing areas, and at least one multiplexer coupled to the one or more touch sensing areas through one or more connecting wire groups on the touch panel, wherein each of the one or more connecting wire groups comprises one or more connecting wires, and each of the at least one multiplexer comprises one or more switch groups each coupled between one of the one or more touch sensing wires and one of the one or more connecting wire groups. The touch controller comprises one or more pins and control logic. The one or more pins are connected to the at least one multiplexer via one or more touch control wires and one or more touch sensing wires. The control logic provides one or more control signals configured to be transmitted through the one of more touch control wires to respectively control one or more switches in each of the switch groups.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 7A and 7B are schematic diagrams of detailed circuit structures of the multiplexers.

DETAILED DESCRIPTION

Figure 1:
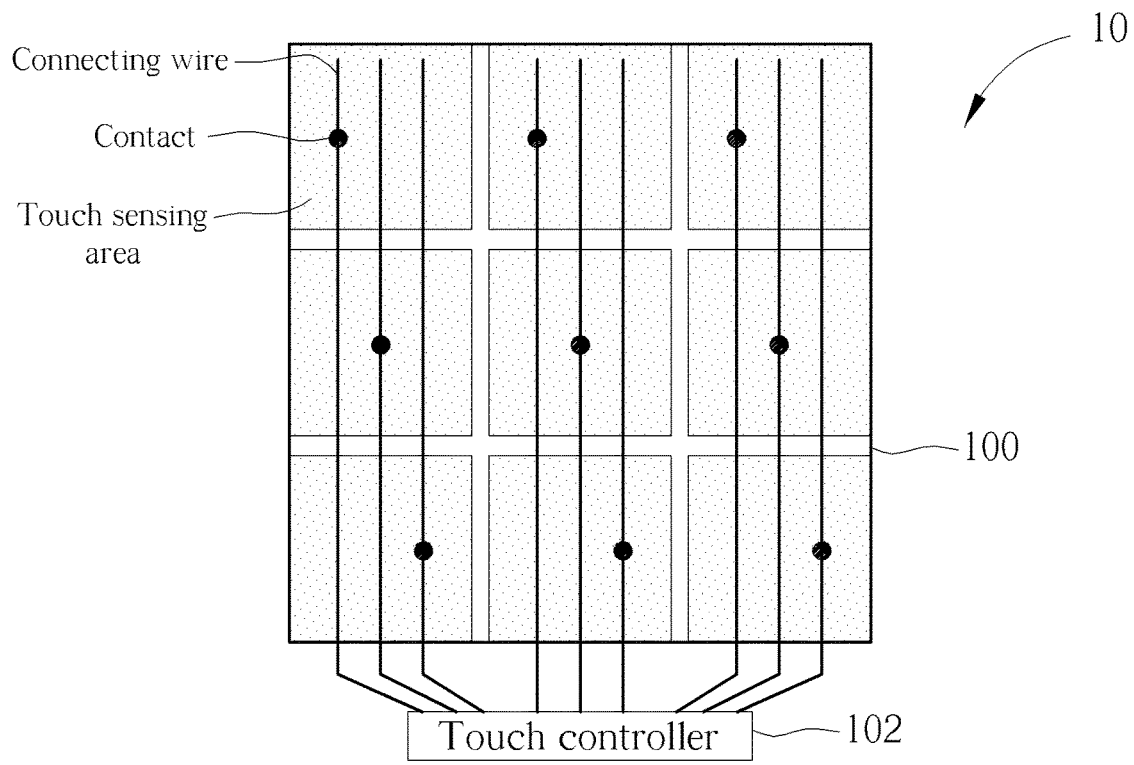
FIG. 1 is a schematic diagram of a general touch sensor system.
Figure 2:
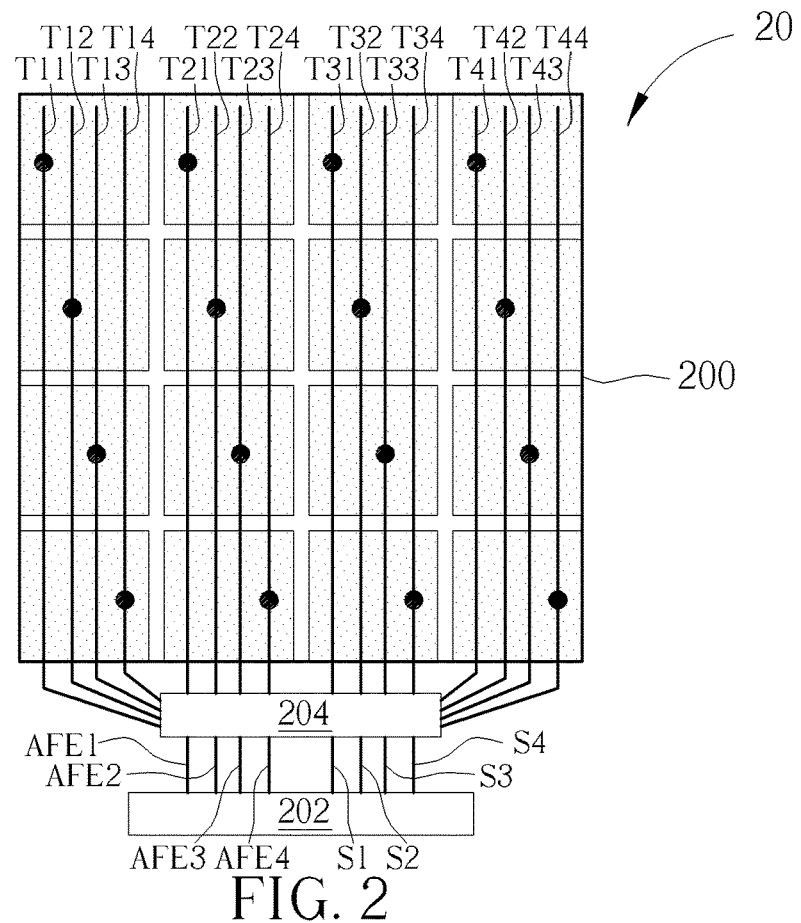
FIG. 2 is a schematic diagram of a touch sensor system according to an embodiment of the present invention.

Please refer to FIG. 2, which is a schematic diagram of a touch sensor system 20 according to an embodiment of the present invention. As shown in FIG. 2, the touch sensor system 20 includes a touch panel 200, a touch controller 202 and a multiplexer (MUX) 204. The touch panel 200 includes 16 touch sensing areas arranged in a 4×4 array. The touch controller 202, coupled to the MUX 204, is used for controlling touch driving and sensing on the touch panel 200. The touch controller 202 may be a touch control integrated circuit (IC) or other type of control circuit. The touch controller 202 may include one or more pins connected to the MUX 204 via one or more touch control wires and one or more touch sensing wires. Each pin may be connected to one of the one or more touch control wires or one of the one or more touch sensing wires. In this example, the touch controller 202 has 8 pins connected to the MUX 204, where 4 pins are connected with the touch control wires S1-S4 and 4 pins are connected with the touch sensing wires AFE1-AFE4.

In detail, each of the touch sensing wires AFE1-AFE4 may transmit driving signals from the touch controller 202 to the MUX 204. The driving signals are forwarded to the touch panel 200 to perform driving on one of the touch sensing areas on the touch panel 200. The touch sensing wires AFE1-AFE4 then transmit sensing signals from the touch sensing areas to the touch controller 202. It is noted that in other embodiments, not all of the touch sensing areas is connected to the touch controller via the multiplexer(s). In other words, at least one touch sensing area may be directly connected to the touch controller.

Please keep referring to FIG. 2. The MUX 204 is coupled between the touch panel 200 and the touch controller 202. In detail, the MUX 204 is connected to the touch sensing areas on the touch panel 100 via 16 connecting wires T11-T44, each of which is connected to one touch sensing area via a contact, as shown in FIG. 2. The MUX 204 includes one or more switches. In each of the one or more switches, a first connection terminal is coupled to the touch controller 202 via a touch sensing wire, a second connection terminal is coupled to a touch sensing area on the touch panel 200, and a control terminal is coupled to a touch control wire, for receiving a control signal from the touch controller 202. In other words, each switch is connected between the touch controller 202 and one of the touch sensing areas, and receives a control signal from one of the touch control wires S1-S4. With the implementation and connection of the one or more switches in the MUX 204, the touch controller 202 is allowed to perform touch driving and sensing in a specific order by triggering the touch control wires S1-S4 in an order, where the touch control wires S1-S4 may control different switches in the MUX 204 to be open or closed.

Please note that several of the one or more switches connected to specific touch sensing areas (e.g., a row or a column of touch sensing areas) may receive the same control signal from the same touch control wire, so that the specific touch sensing areas may undergo touch driving and sensing simultaneously. In this manner, the touch sensing areas are allowed to undergo touch driving and sensing in a specific order such as row by row or column by column.

Figure 3:
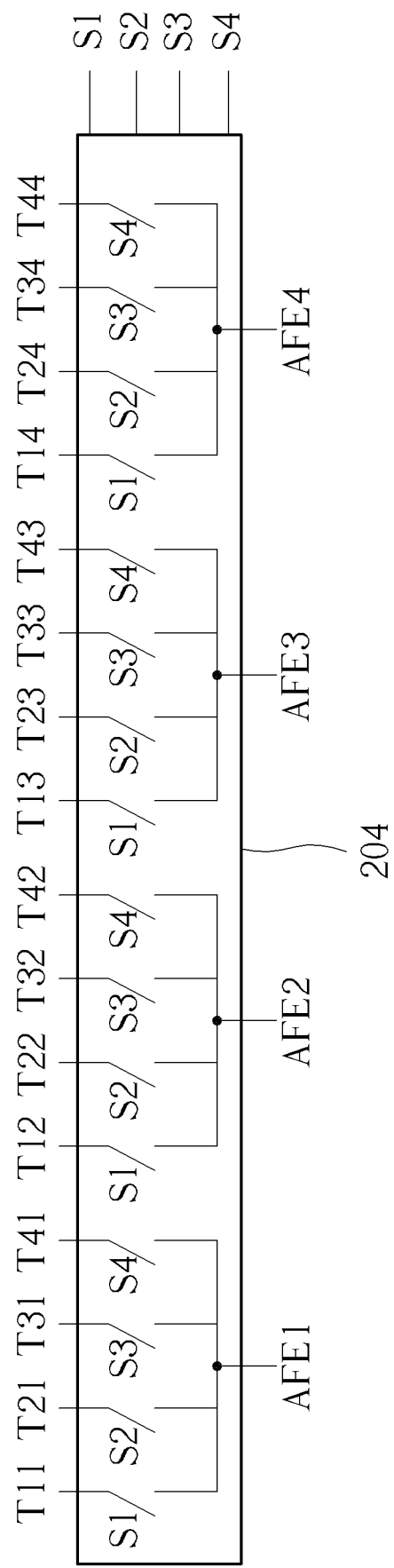
FIG. 3 is a schematic diagram of an exemplary circuit structure of the multiplexer.

An exemplary circuit structure of the MUX 204 is illustrated in FIG. 3. The MUX 204 includes 16 switches coupled to 16 touch sensing areas on the touch panel 200 via the connecting wires T11-T44, respectively. These switches are further coupled to the touch controller 202 via the touch sensing wires AFE1-AFE4. In detail, 4 switches respectively connected to the connecting wires T11, T21, T31 and T41 on one connection terminal are connected to the touch sensing wire AFE1 on another connection terminal, 4 switches respectively connected to the connecting wires T12, T22, T32 and T42 on one connection terminal are connected to the touch sensing wire AFE2 on another connection terminal, 4 switches respectively connected to the connecting wires T13, T23, T33 and T43 on one connection terminal are connected to the touch sensing wire AFE3 on another connection terminal, and 4 switches respectively connected to the connecting wires T14, T24, T34 and T44 on one connection terminal are connected to the touch sensing wire AFE4 on another connection terminal. Further, 4 switches respectively connected to the connecting wires T11, T12, T13 and T14 are controlled by a control signal on the touch control wire S1, 4 switches respectively connected to the connecting wires T21, T22, T23 and T24 are controlled by a control signal on the touch control wire S2, 4 switches respectively connected to the connecting wires T31, T32, T33 and T34 are controlled by a control signal on the touch control wire S3, and 4 switches respectively connected to the connecting wires T41, T42, T43 and T44 are controlled by a control signal on the touch control wire S4. In this manner, the touch driving and sensing operations on the first column of touch sensing areas on the touch panel 200 is controlled by the touch control wire S1. The touch driving and sensing operations on the second column of touch sensing areas on the touch panel 200 is controlled by the touch control wire S2. The touch driving and sensing operations on the third column of touch sensing areas on the touch panel 200 is controlled by the touch control wire S3. The touch driving and sensing operations on the fourth column of touch sensing areas on the touch panel 200 is controlled by the touch control wire S4.

Figure 4:
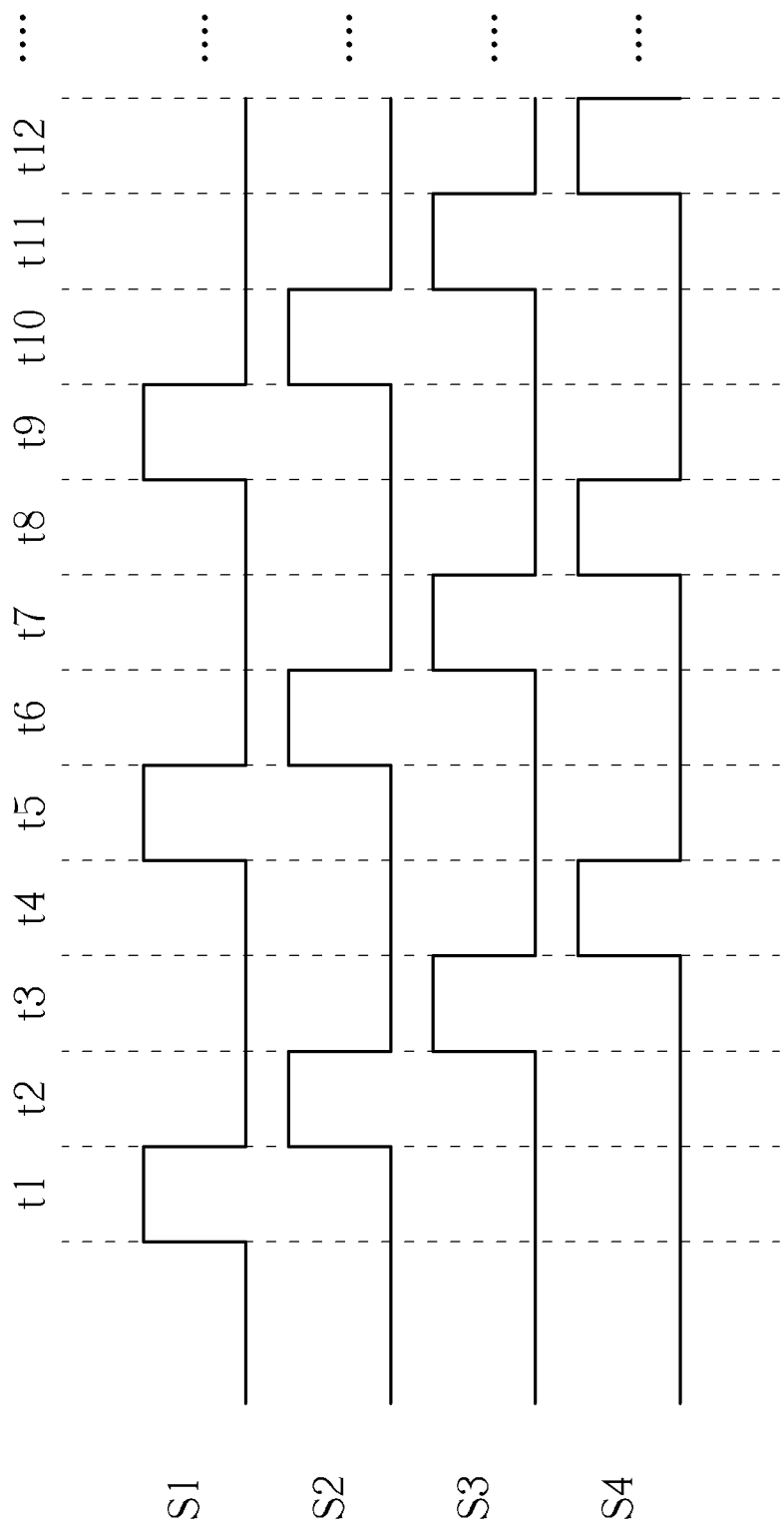
FIG. 4 is a waveform diagram of control signals on the touch control wires.

Please refer to FIG. 4, which is a waveform diagram of control signals on the touch control wires S1-S4. As shown in FIG. 4, the control signals are triggered in an order of S1, S2, S3 and S4 in time periods t1-t4. A control signal controls the one or more switches to be open when it is in a lower level, and controls the one or more switches to be closed when it is in a higher level. Please refer to FIG. 4 together with FIG. 3 for detailed descriptions. In the time period t1, the control signal on the touch control wire S1 is triggered, allowing the touch sensing wires AFE1-AFE4 to be connected to the connecting wires T11, T12, T13 and T14, respectively. The touch controller 202 can thereby perform touch driving and sensing on the first column of touch sensing areas on the touch panel 200. In the time period t2, the control signal on the touch control wire S2 is triggered, allowing the touch sensing wires AFE1-AFE4 to be connected to the connecting wires T21, T22, T23 and T24, respectively. The touch controller 202 can thereby perform touch driving and sensing on the second column of touch sensing areas on the touch panel 200. In the time period t3, the control signal on the touch control wire S3 is triggered, allowing the touch sensing wires AFE1-AFE4 to be connected to the connecting wires T31, T32, T33 and T34, respectively. The touch controller 202 can thereby perform touch driving and sensing on the third column of touch sensing areas on the touch panel 200. In the time period t4, the control signal on the touch control wire S4 is triggered, allowing the touch sensing wires AFE1-AFE4 to be connected to the connecting wires T41, T42, T43 and T44, respectively. The touch controller 202 can thereby perform touch driving and sensing on the fourth column of touch sensing areas on the touch panel 200. The touch controller 202 and the MUX 204 then repeat their operations in time periods t5-t8, t9-t12, and so on. In this manner, the touch controller 202 may control the MUX 204 to perform touch driving and sensing on the touch sensing areas column by column. The touch driving and sensing operations for the entire touch sensing areas can be accomplished in 4 time periods.

Please note that according to the embodiments of the present invention, the pin number of the touch controller may be reduced. With a conventional wire connection method without the usage of any MUXs in the prior art, a touch panel having 16 touch sensing areas arranged in a 4×4 array needs 16 connecting wires for the touch driving and sensing operations on the touch sensing areas. Therefore, 16 I/O pins on the touch IC is necessary. In contrast, in the embodiment shown in FIG. 2, the touch controller 202 has only 8 pins connected to the MUX 204, where 4 pins are connected with the touch control wires S1-S4 and 4 pins are connected with the touch sensing wires AFE1-AFE4. Note that the MUX 204 may be an analog MUX fabricated on the glass substrate of the touch panel 200 with a touch panel process. When the MUX 204 is implemented on the glass substrate with the touch panel process, the touch controller 202, which is usually implemented by a touch IC, only requires 8 I/O pins. The reduced pin number decreases the die size of the touch IC, and thereby reduces the cost. With the decreased pin number, there may be more space for the bonding pitch in each I/O pin; this enhances the wire bonding quality of the touch IC.

Figure 5:
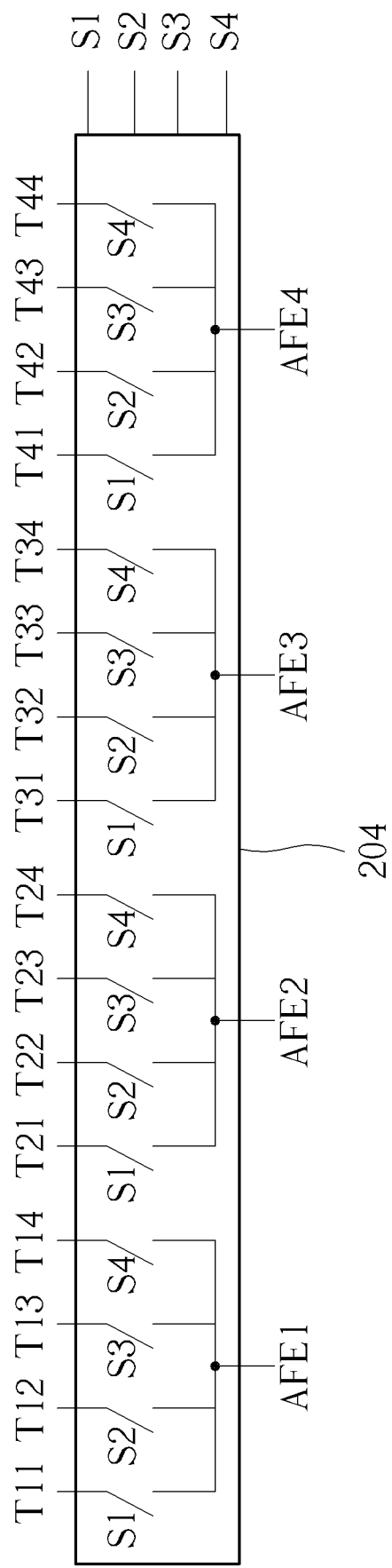
FIG. 5 is a schematic diagram of another exemplary circuit structure of the multiplexer.

In another embodiment, the touch controller 202 may also perform touch driving and sensing on the touch sensing areas row by row. For example, please refer to FIG. 5, which is a schematic diagram of another exemplary circuit structure of the MUX 204. As shown in FIG. 5, the MUX 204 also includes 16 switches coupled to 16 touch sensing areas on the touch panel 200 via the connecting wires T11-T44, respectively. These switches are further coupled to the touch controller 202 via the touch sensing wires AFE1-AFE4. In detail, 4 switches respectively connected to the connecting wires T11, T12, T13 and T14 on one connection terminal are connected to the touch sensing wire AFE1 on another connection terminal, 4 switches respectively connected to the connecting wires T21, T22, T23 and T24 on one connection terminal are connected to the touch sensing wire AFE2 on another connection terminal, 4 switches respectively connected to the connecting wires T31, T32, T33 and T34 on one connection terminal are connected to the touch sensing wire AFE3 on another connection terminal, and 4 switches respectively connected to the connecting wires T41, T42, T43 and T44 on one connection terminal are connected to the touch sensing wire AFE4 on another connection terminal. Further, 4 switches respectively connected to the connecting wires T11, T21, T31 and T41 are controlled by a control signal on the touch control wire S1, 4 switches respectively connected to the connecting wires T12, T22, T32 and T42 are controlled by a control signal on the touch control wire S2, 4 switches respectively connected to the connecting wires T13, T23, T33 and T43 are controlled by a control signal on the touch control wire S3, and 4 switches respectively connected to the connecting wires T14, T24, T34 and T44 are controlled by a control signal on the touch control wire S4. In this manner, the touch driving and sensing operations on the first row of touch sensing areas on the touch panel 200 is controlled by the touch control wire S1. The touch driving and sensing operations on the second row of touch sensing areas on the touch panel 200 is controlled by the touch control wire S2. The touch driving and sensing operations on the third row of touch sensing areas on the touch panel 200 is controlled by the touch control wire S3. The touch driving and sensing operations on the fourth row of touch sensing areas on the touch panel 200 is controlled by the touch control wire S4.

Please refer to FIG. 5 together with FIG. 4 for detailed descriptions. In the time period t1, the control signal on the touch control wire S1 is triggered, allowing the touch sensing wires AFE1-AFE4 to be connected to the connecting wires T11, T21, T31 and T41, respectively. The touch controller 202 can thereby perform touch driving and sensing on the first row of touch sensing areas on the touch panel 200. In the time period t2, the control signal on the touch control wire S2 is triggered, allowing the touch sensing wires AFE1-AFE4 to be connected to the connecting wires T12, T22, T32 and T42, respectively. The touch controller 202 can thereby perform touch driving and sensing on the second row of touch sensing areas on the touch panel 200. In the time period t3, the control signal on the touch control wire S3 is triggered, allowing the touch sensing wires AFE1-AFE4 to be connected to the connecting wires T13, T23, T33 and T43, respectively. The touch controller 202 can thereby perform touch driving and sensing on the third row of touch sensing areas on the touch panel 200. In the time period t4, the control signal on the touch control wire S4 is triggered, allowing the touch sensing wires AFE1-AFE4 to be connected to the connecting wires T14, T24, T34 and T44, respectively. The touch controller 202 can thereby perform touch driving and sensing on the fourth row of touch sensing areas on the touch panel 200. The touch controller 202 and the MUX 204 then repeat their operations in time periods t5-t8, t9-t12, and so on. In this manner, the touch controller 202 may control the MUX 204 to perform touch driving and sensing on the touch sensing areas row by row. The touch driving and sensing operations for the entire touch sensing areas can be accomplished in 4 time periods.

Please note that the present invention provides a circuit structure of a touch sensor system having a MUX disposed between the touch controller and the touch panel. The pin number of the touch controller can therefore be reduced with the MUX implemented on the glass substrate of the touch panel. Those skilled in the art can make modifications and alternations accordingly. For example, as shown in the above embodiments, the connections of the one or more switches in the MUX may be arranged in a specific manner to perform touch driving and sensing row by row or column by column. In another embodiment, the touch driving and sensing operations may be performed by other methods. For example, the second column of touch sensing areas may undergo touch driving and sensing before the first column of touch sensing areas, or the third row of touch sensing areas may undergo touch driving and sensing next to the first row of touch sensing areas. Alternatively, the touch driving and sensing operations may be performed on the touch sensing areas in any possible orders other than the row-by-row and column-by-column manners. In addition, the circuit structure of the touch panel 200 and the MUX 204 shown in FIG. 2 is only one of various possible implementations. For example, in the touch panel 200 shown in FIG. 2, each of the connecting wires T11-T44 extends from the MUX 204 to the upper side of the touch panel 200 and has the same length. This arrangement allows each of the connecting wires T11-T44 to have similar resistance-capacitance (RC) characteristics. In another embodiment, the connecting wires T11-T44 may have different lengths, as long as each of the connecting wires T11-T44 is long enough to connect with the corresponding touch sensing area. Furthermore, there is only one MUX 204 in the embodiment shown in FIG. 2, but in another embodiment, there may be more than one MUX disposed between the touch panel and the touch controller.

Figure 6:
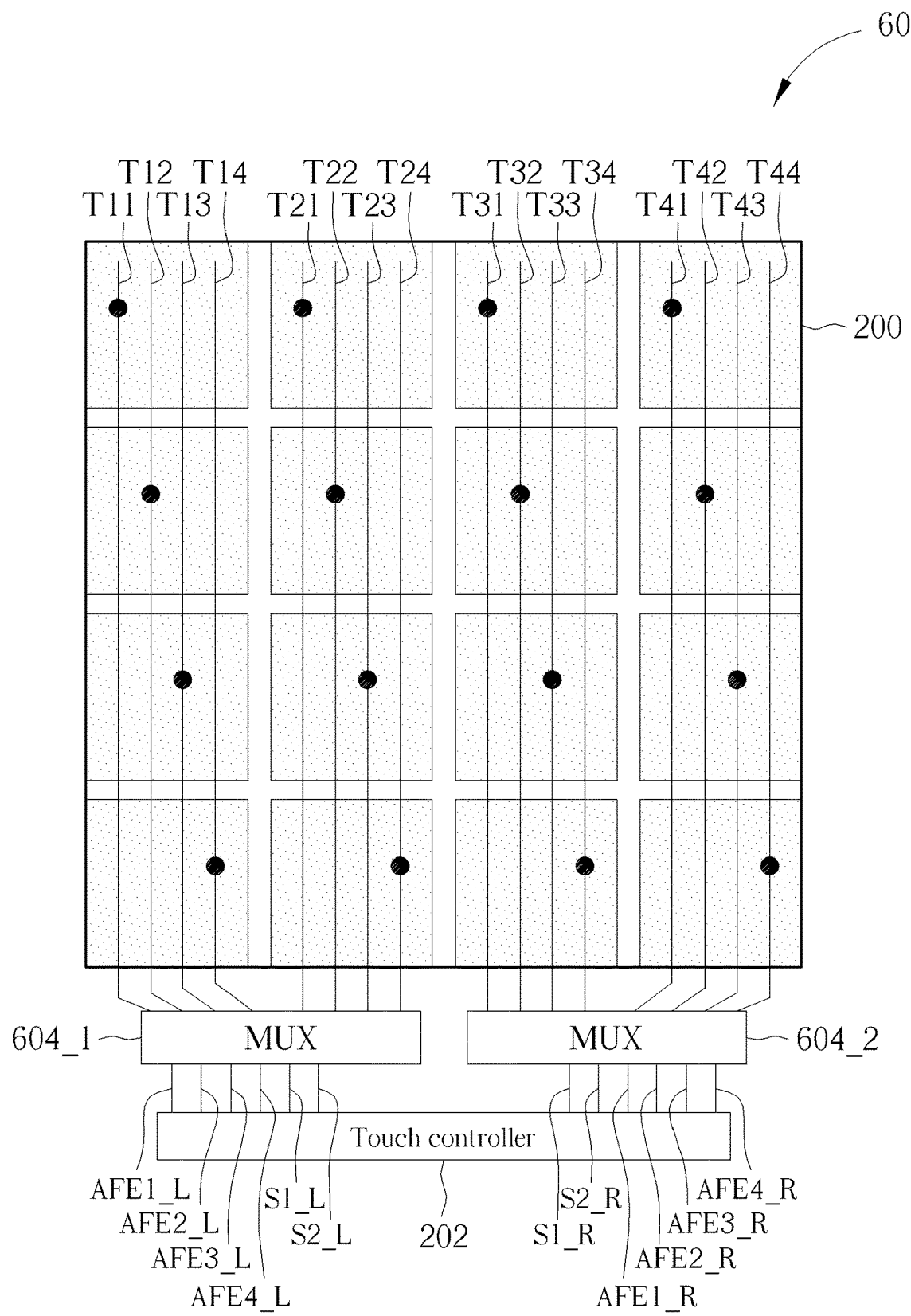
FIG. 6 is a schematic diagram of another touch sensor system according to an embodiment of the present invention.

For example, please refer to FIG. 6, which is a schematic diagram of another touch sensor system 60 according to an embodiment of the present invention. As shown in FIG. 6, the circuit structure of the touch sensor system 60 is similar to that of the touch sensor system 20; hence, circuit elements and signals having similar functions are denoted by the same symbols. A main difference between the touch sensor system 60 and the touch sensor system 20 is that the touch sensor system 60 has two MUXs 604_1 and 604_2 while the touch sensor system 20 has only one MUX 204. The touch sensor system 60 also includes 16 touch sensing areas arranged in a 4×4 array, and each of the touch sensing areas are connected to the MUX 604_1 or 604_2 via 16 connecting wires T11-T44, respectively. More specifically, the connecting wires T11, T12, T13, T14, T21, T22, T23 and T24 connect the touch sensing areas located on the left half of the touch panel 200 to the MUX 604_1, and the connecting wires T31, T32, T33, T34, T41, T42, T43 and T44 connect the touch sensing areas located on the right half of the touch panel 200 to the MUX 604_2. The MUX 604_1 is further connected to the touch controller 202 via touch control wires S1_L and S2_L and touch sensing wires AFE1_L-AFE4_L. The MUX 604_2 is further connected to the touch controller 202 via touch control wires S1_R and S2_R and touch sensing wires AFE1_R-AFE4_R. In this case, the touch controller 202 has totally 12 pins connected to the MUXs 604_1 and 604_2, where 4 pins are connected with the touch control wires S1_L, S2_L, S1_R and S2_R, and 8 pins are connected with the touch sensing wires AFE1_L-AFE4_L and AFE1_R-AFE4_R. In this case, the pin number of the touch controller 202 is still fewer than that in the prior art.

Please refer to FIGS. 7A and 7B for detailed circuit structures of the MUXs 604_1 and 604_2. As shown in FIG. 7A, the MUX 604_1 includes 8 switches coupled to 8 touch sensing areas on the left half of the touch panel 200 via the connecting wires T11, T12, T13, T14, T21, T22, T23 and T24, respectively. These switches are further coupled to the touch controller 202 via the touch sensing wires AFE1_L-AFE4_L. In detail, 2 switches respectively connected to the connecting wires T11 and T21 on one connection terminal are connected to the touch sensing wire AFE1_L on another connection terminal, 2 switches respectively connected to the connecting wires T12 and T22 on one connection terminal are connected to the touch sensing wire AFE2_L on another connection terminal, 2 switches respectively connected to the connecting wires T13 and T23 on one connection terminal are connected to the touch sensing wire AFE3_L on another connection terminal, and 2 switches respectively connected to the connecting wires T14 and T24 on one connection terminal are connected to the touch sensing wire AFE4_L on another connection terminal. Further, 4 switches respectively connected to the connecting wires T11, T12, T13 and T14 are controlled by a control signal on the touch control wire S1_L, and 4 switches respectively connected to the connecting wires T21, T22, T23 and T24 are controlled by a control signal on the touch control wire S2_L. In this manner, the touch driving and sensing operations on the first column of touch sensing areas on the touch panel 200 is controlled by the touch control wire S1_L. The touch driving and sensing operations on the second column of touch sensing areas on the touch panel 200 is controlled by the touch control wire S2_L.

As shown in FIG. 7B, the MUX 604_2 includes 8 switches coupled to 8 touch sensing areas on the right half of the touch panel 200 via the connecting wires T31, T32, T33, T34, T41, T42, T43 and T44, respectively. These switches are further coupled to the touch controller 202 via the touch sensing wires AFE1_R-AFE4_R. In detail, 2 switches respectively connected to the connecting wires T31 and T41 on one connection terminal are connected to the touch sensing wire AFE1_R on another connection terminal, 2 switches respectively connected to the connecting wires T32 and T42 on one connection terminal are connected to the touch sensing wire AFE2_R on another connection terminal, 2 switches respectively connected to the connecting wires T33 and T43 on one connection terminal are connected to the touch sensing wire AFE3_R on another connection terminal, and 2 switches respectively connected to the connecting wires T34 and T44 on one connection terminal are connected to the touch sensing wire AFE4_R on another connection terminal. Further, 4 switches respectively connected to the connecting wires T31, T32, T33 and T34 are controlled by a control signal on the touch control wire S1_R, and 4 switches respectively connected to the connecting wires T41, T42, T43 and T44 are controlled by a control signal on the touch control wire S2_R. In this manner, the touch driving and sensing operations on the third column of touch sensing areas on the touch panel 200 is controlled by the touch control wire S1_R. The touch driving and sensing operations on the fourth column of touch sensing areas on the touch panel 200 is controlled by the touch control wire S2_R.

Figure 8:
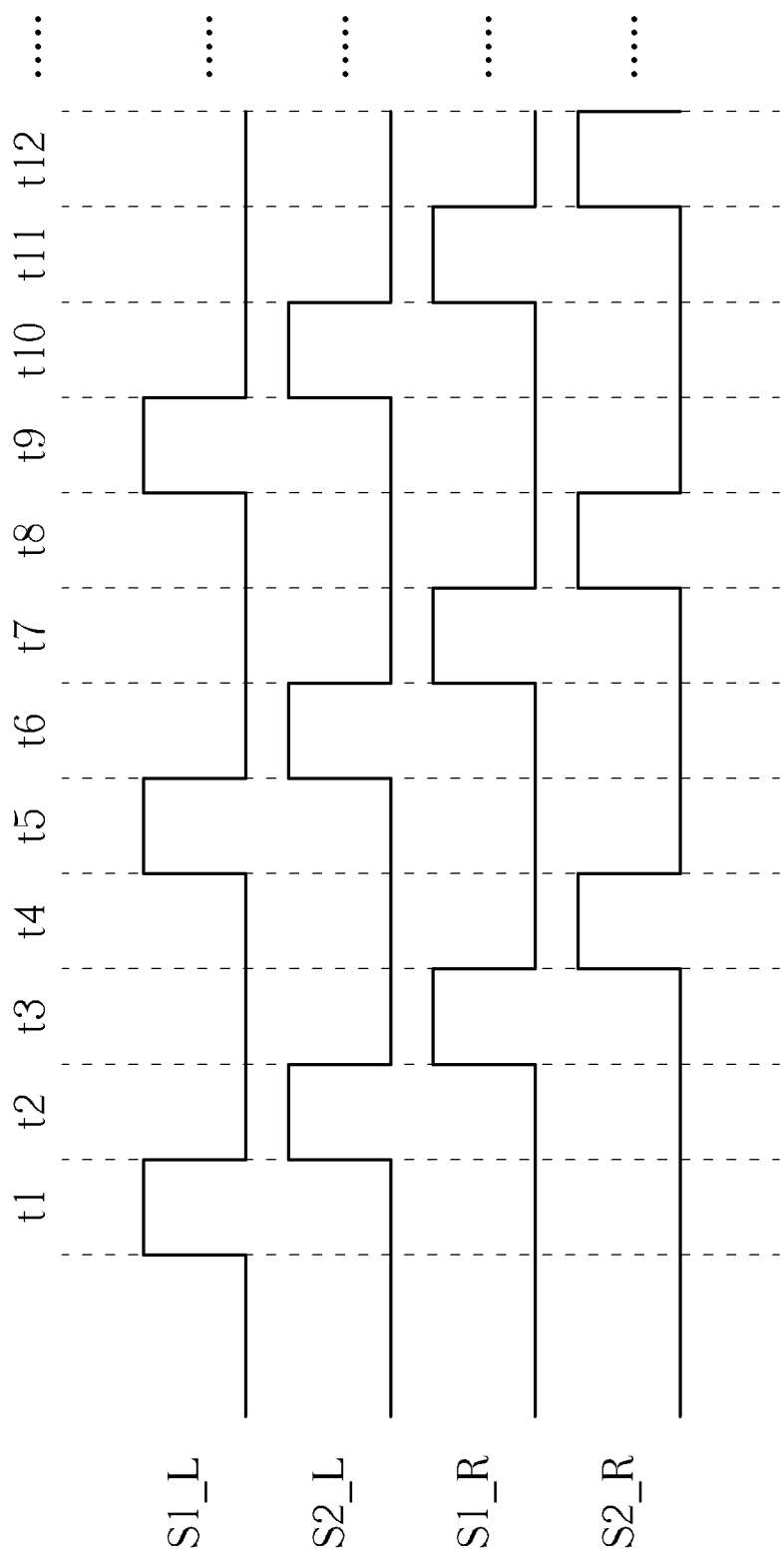
FIG. 8 is a waveform diagram of control signals on the touch control wires.

Please refer to FIG. 8, which is a waveform diagram of control signals on the touch control wires S1_L, S2_L, S1_R and S2_R. As shown in FIG. 8, the control signals are triggered in an order of S1_L, S2_L, S1_R and S2_R in time periods t1-t4. A control signal controls the one or more switches to be open when it is in a lower level, and controls the one or more switches to be closed when it is in a higher level. Please refer to FIG. 8 together with FIGS. 7A and 7B for detailed descriptions. In the time period t1, the control signal on the touch control wire S1_L is triggered, allowing the touch sensing wires AFE1_L-AFE4_L to be connected to the connecting wires T11, T12, T13 and T14, respectively. The touch controller 202 can thereby perform touch driving and sensing on the first column of touch sensing areas on the touch panel 200. In the time period t2, the control signal on the touch control wire S2_L is triggered, allowing the touch sensing wires AFE1_L-AFE4_L to be connected to the connecting wires T21, T22, T23 and T24, respectively. The touch controller 202 can thereby perform touch driving and sensing on the second column of touch sensing areas on the touch panel 200. In the time period t3, the control signal on the touch control wire S1_R is triggered, allowing the touch sensing wires AFE1_R-AFE4_R to be connected to the connecting wires T31, T32, T33 and T34, respectively. The touch controller 202 can thereby perform touch driving and sensing on the third column of touch sensing areas on the touch panel 200. In the time period t4, the control signal on the touch control wire S2_R is triggered, allowing the touch sensing wires AFE1_R-AFE4_R to be connected to the connecting wires T41, T42, T43 and T44, respectively. The touch controller 202 can thereby perform touch driving and sensing on the fourth column of touch sensing areas on the touch panel 200. The touch controller 202 and the MUXs 604_1 and 604_2 then repeat their operations in time periods t5-t8, t9-t12, and so on. In this manner, the touch controller 202 may control the MUXs 604_1 and 604_2 to perform touch driving and sensing on the touch sensing areas column by column. The touch driving and sensing operations for the entire touch sensing areas can be accomplished in 4 time periods.

In another embodiment, in a touch sensor system having at least two MUXs, the touch driving and sensing may be performed on at least two columns or two rows of touch sensing areas simultaneously. Therefore, the touch controller may control the MUXs to perform touch driving and sensing on at least two columns or two rows of touch sensing areas simultaneously by triggering control signals on different touch control wires simultaneously. In this manner, the touch driving and sensing operations may be performed in a faster speed, so that the performance of the touch sensor system may be enhanced.

Figure 9:
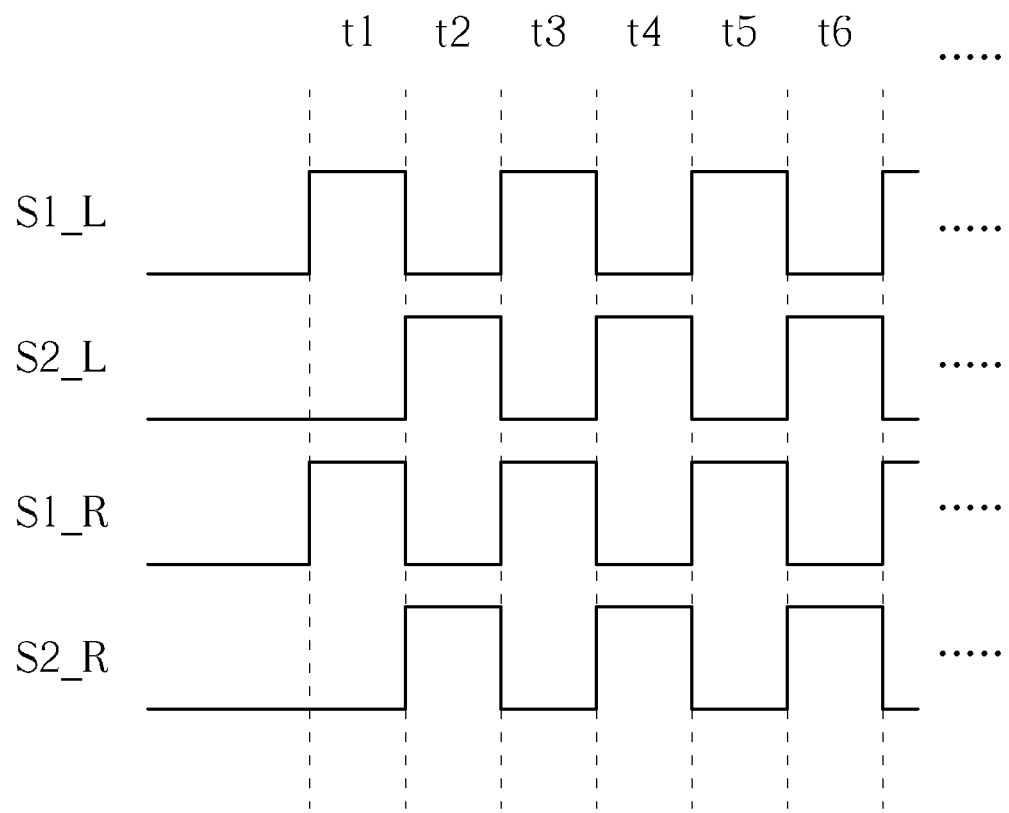
FIG. 9 is a waveform diagram of control signals on the touch control wires according to another embodiment of the present invention.

For example, please refer to FIG. 9, which is a waveform diagram of control signals on the touch control wires S1_L, S2_L, S1_R and S2_R according to another embodiment of the present invention. As shown in FIG. 9, the control signals on the touch control wires S1_L and S1_R are triggered simultaneously, and the control signals on the touch control wires S2_L and S2_R are trigger simultaneously. In such a situation, in the time period t1, the control signals on the touch control wires S1_L and S1_R are triggered; this allows the touch sensing wires AFE1_L-AFE4_L to be connected to the connecting wires T11, T12, T13 and T14, respectively, and allows the touch sensing wires AFE1_R-AFE4_R to be connected to the connecting wires T31, T32, T33 and T34, respectively. The touch controller 202 can thereby perform touch driving and sensing on the first and third columns of touch sensing areas on the touch panel 200 simultaneously. In the time period t2, the control signals on the touch control wires S2_L and S2_R are triggered; this allows the touch sensing wires AFE1_L-AFE4_L to be connected to the connecting wires T21, T22, T23 and T24, respectively, and allows the touch sensing wires AFE1_R-AFE4_R to be connected to the connecting wires T41, T42, T43 and T44, respectively. The touch controller 202 can thereby perform touch driving and sensing on the second and fourth columns of touch sensing areas on the touch panel 200 simultaneously. The touch controller 202 and the MUXs 604_1 and 604_2 then repeat their operations in time periods t3-t4, t5-t6, and so on. In this manner, the touch controller 202 may control the MUXs 604_1 and 604_2 to perform touch driving and sensing on two columns of touch sensing areas simultaneously. The touch driving and sensing operations for the entire touch sensing areas can be accomplished in 2 time periods. As a result, the speed of touch driving and sensing operations can be increased.

Based on the above embodiments and illustrations shown in FIGS. 2-9, those skilled in the art can derive the operations of performing touch driving and sensing on at least two rows of touch sensing areas simultaneously. The detailed operations will not be narrated herein.

Please note that the operational speed of touch driving and sensing can be increased with an increasing number of MUXs. For example, if there are 4 MUXs in a touch sensor system, there may be 4 columns or 4 rows of touch sensing areas undergoing touch driving and sensing operations simultaneously. However, the increasing number of MUXs may be followed by an increasing number of I/O pins in the touch controller. Those skilled in the art are allowed to make a selection between a higher operational speed and fewer number of I/O pins according to system requirements.

Therefore, the circuit structure and wire connection of the MUX(s) may be arranged to realize any possible orders of touch driving and sensing operations; this should not be limited herein.

Figure 10:
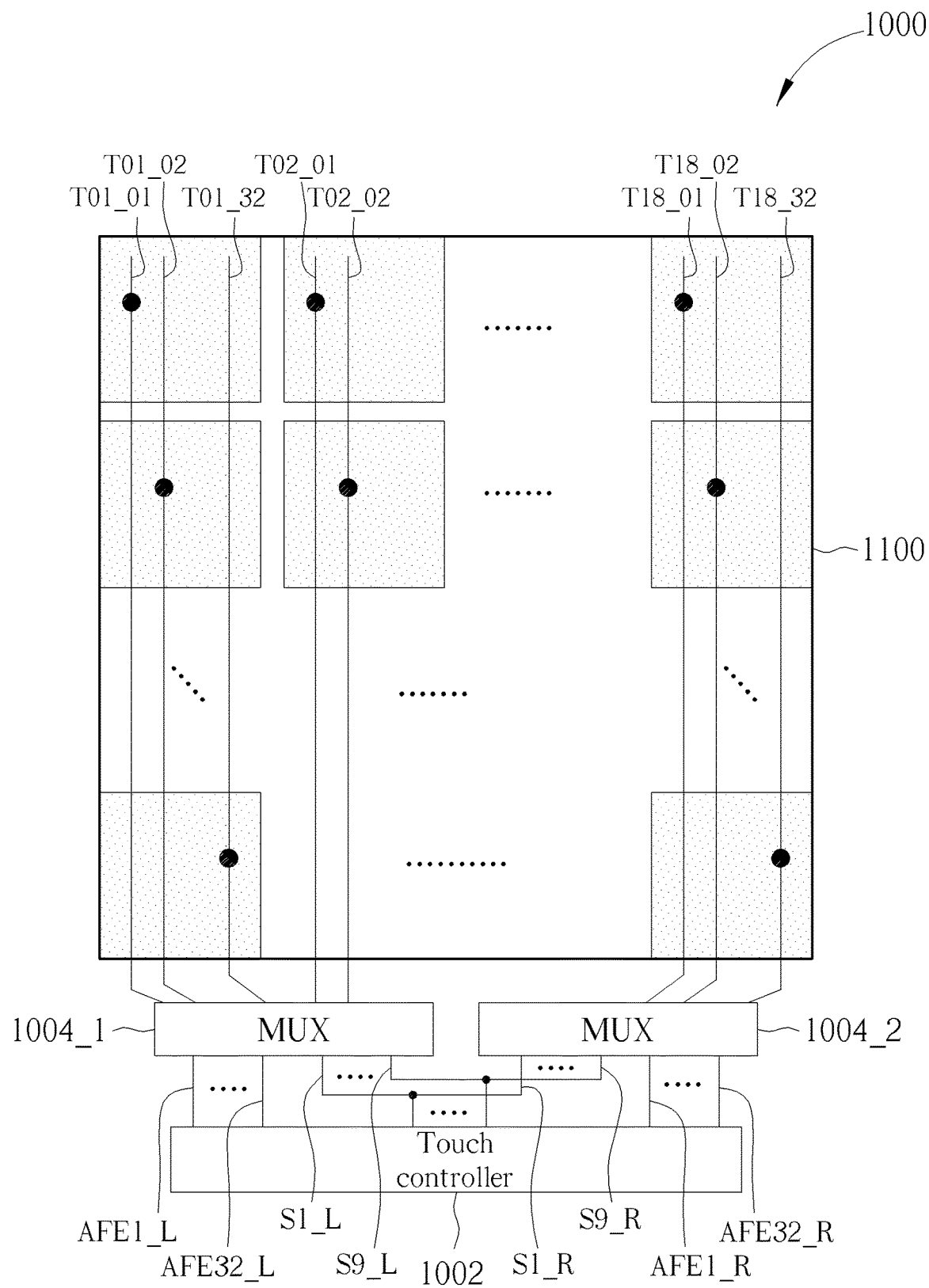
FIG. 10 is a schematic diagram of a touch sensor system according to an embodiment of the present invention.

Please refer to FIG. 10, which is a schematic diagram of a touch sensor system 1000 according to an embodiment of the present invention. As shown in FIG. 10, the touch sensor system 1000 includes a touch panel 1100, a touch controller 1002 and MUXs 1004_1 and 1004_2. The touch panel 1100 is a large touch panel having 576 touch sensing areas arranged in a 32×18 array, i.e., there are 32 rows and 18 columns of touch sensing areas. These touch sensing areas are connected to the MUXs 1004_1 or 1004_2 via 576 connecting wires T01_01-T18_32, respectively. More specifically, the connecting wires T01_01-T09_32 connect the touch sensing areas located on the left half of the touch panel 1100 to the MUX 1004_1, and the connecting wires T10_01-T18_32 connect the touch sensing areas located on the right half of the touch panel 1100 to the MUX 1004_2. The MUX 1004_1 is further connected to the touch controller 1002 via touch control wires S1_L-S9_L and touch sensing wires AFE1_L-AFE32_L. The MUX 1004_2 is further connected to the touch controller 1002 via touch control wires S1_R-S9_R and touch sensing wires AFE1_R-AFE32_R.

Figure 11A:
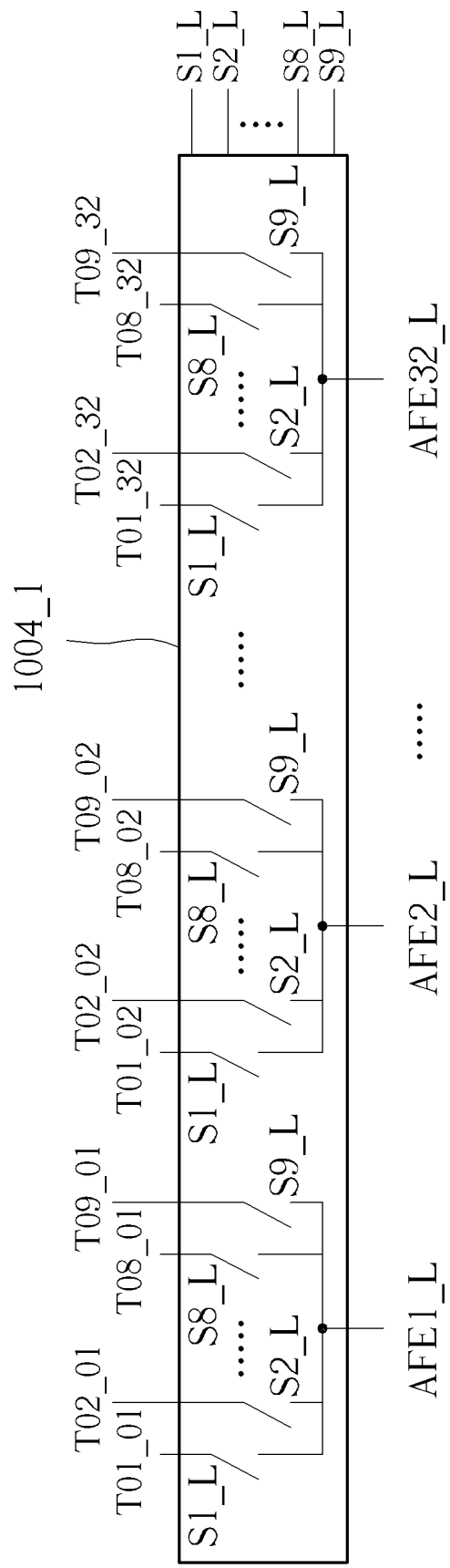
FIGS. 11A and 11B are schematic diagrams of detailed circuit structures of the multiplexers.
Figure 11B:
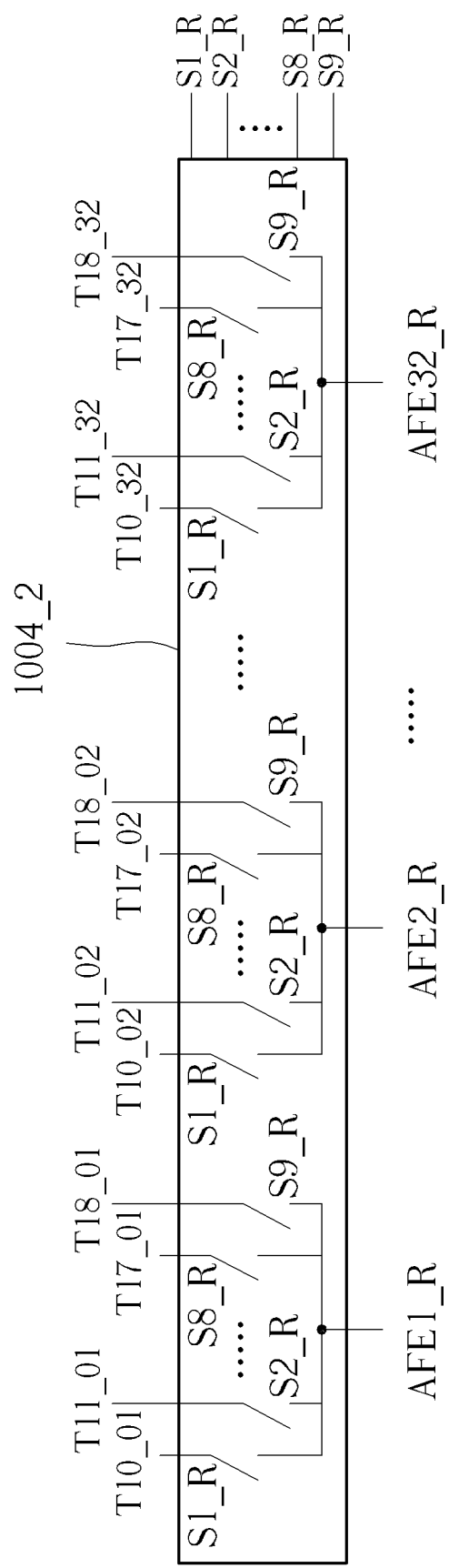

Please refer to FIGS. 11A and 11B for detailed circuit structures of the MUXs 1004_1 and 1004_2. As shown in FIG. 11A, the MUX 1004_1 includes 9×32 switches coupled to 288 touch sensing areas on the left half of the touch panel 1100 via the connecting wires T01_01-T09_32, respectively. These switches are further coupled to the touch controller 1002 via the touch sensing wires AFE1_L-AFE32_L. In detail, 9 switches respectively connected to the connecting wires T01_01-T09_01 on one connection terminal are connected to the touch sensing wire AFE1_L on another connection terminal, 9 switches respectively connected to the connecting wires T01_02-T09_02 on one connection terminal are connected to the touch sensing wire AFE2_L on another connection terminal, and so on. Finally, 9 switches respectively connected to the connecting wires T01_32-T09_32 on one connection terminal are connected to the touch sensing wire AFE32_L on another connection terminal. Further, 32 switches respectively connected to the connecting wires T01_01-T01_32 are controlled by a control signal on the touch control wire S1_L, 32 switches respectively connected to the connecting wires T02_01-T02_32 are controlled by a control signal on the touch control wire S2_L, and so on. Finally, 32 switches respectively connected to the connecting wires T09_01-T09_32 are controlled by a control signal on the touch control wire S9_L. In this manner, the touch driving and sensing operations on the first to ninth columns of touch sensing areas on the touch panel 1100 are controlled by the touch control wires S1_L-S9_L, respectively.

As shown in FIG. 11B, the MUX 1004_2 includes 9×32 switches coupled to 288 touch sensing areas on the right half of the touch panel 1100 via the connecting wires T10_01-T18_32, respectively. These switches are further coupled to the touch controller 1002 via the touch sensing wires AFE1_R-AFE32_R. In detail, 9 switches respectively connected to the connecting wires T10_01-T18_01 on one connection terminal are connected to the touch sensing wire AFE1_R on another connection terminal, 9 switches respectively connected to the connecting wires T10_02-T18_02 on one connection terminal are connected to the touch sensing wire AFE2_R on another connection terminal, and so on. Finally, 9 switches respectively connected to the connecting wires T10_32-T18_32 on one connection terminal are connected to the touch sensing wire AFE32_R on another connection terminal. Further, 32 switches respectively connected to the connecting wires T10_01-T10_32 are controlled by a control signal on the touch control wire S1_R, 32 switches respectively connected to the connecting wires T11_01-T11_32 are controlled by a control signal on the touch control wire S2_R, and so on. Finally, 32 switches respectively connected to the connecting wires T18_01-T18_32 are controlled by a control signal on the touch control wire S9_R. In this manner, the touch driving and sensing operations on the tenth to eighteenth columns of touch sensing areas on the touch panel 1100 are controlled by the touch control wires S1_R-S9_R, respectively.

Figure 12:
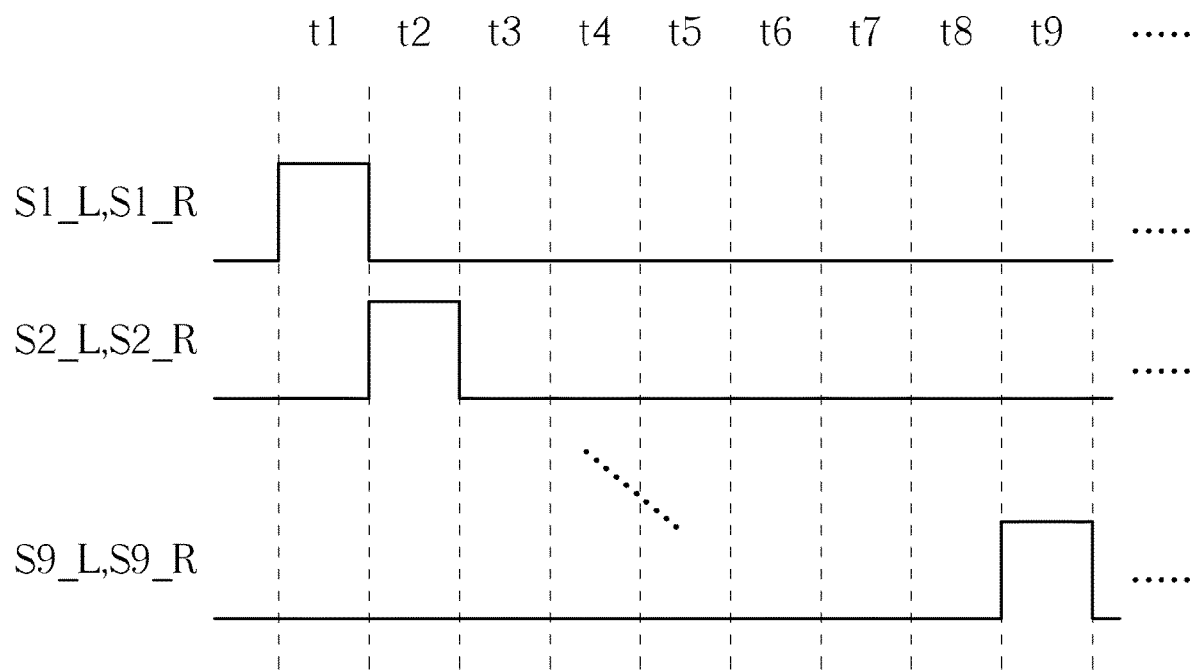
FIG. 12 is a waveform diagram of control signals on the touch control wires.

Please refer to FIG. 12, which is a waveform diagram of control signals on the touch control wires S1_L-S9_L and S1_R-S9_R. As shown in FIG. 12, the control signals on the touch control wires S1_L and S1_R are triggered simultaneously, and the control signals on the touch control wires S2_L and S2_R are trigger simultaneously, and so on. In such a situation, in the time period t1, the control signals on the touch control wires S1_L and S1_R are triggered; this allows the touch sensing wires AFE1_L-AFE32_L to be connected to the connecting wires T01_01-T01_32, respectively, and allows the touch sensing wires AFE1_R-AFE32_R to be connected to the connecting wires T10_01-T10_32, respectively. The touch controller 1002 can thereby perform touch driving and sensing on the first and tenth columns of touch sensing areas on the touch panel 1100 simultaneously. In the time period t2, the control signals on the touch control wires S2_L and S2_R are triggered; this allows the touch sensing wires AFE1_L-AFE32_L to be connected to the connecting wires T02_01-T02_32, respectively, and allows the touch sensing wires AFE1_R-AFE32_R to be connected to the connecting wires T11_01-T11_32, respectively. The touch controller 1002 can thereby perform touch driving and sensing on the second and eleventh columns of touch sensing areas on the touch panel 1100 simultaneously. Those skilled in the art should be able to derive the operations in time periods t3-t9 according to the above descriptions and the illustrations in FIGS. 11A, 11B and 12; these will not be narrated herein. The touch controller 1002 and the MUXs 1004_1 and 1004_2 then repeat their operations after the time period t9. In this manner, the touch controller 1002 may control the MUXs 1004_1 and 1004_2 to perform touch driving and sensing on two columns of touch sensing areas simultaneously. The touch driving and sensing operations for the entire touch sensing areas can be accomplished in 9 time periods.

Please note that, since the control signals on the touch control wires S1_L-S9_L and S1_R-S9_R can be triggered simultaneously, the touch control wires S1_L-S9_L can be connected to the touch control wires S1_R-S9_R, respectively, in order to save the pin number, as shown in FIG. 10. In such a situation, the touch controller 1002 has 9 pins connected to the touch control wires S1_L-S9_L and S1_R-S9_R. Therefore, in the embodiment shown in FIG. 10, the touch controller 1002 has totally 73 pins connected to the MUXs 1004_1 and 1004_2, where 9 pins are connected with the touch control wires S1_L-S9_L and S1_R-S9_R and 64 pins are connected with the touch sensing wires AFE1_L-AFE32_L and AFE1_R-AFE32_R. In contrast to the prior art where a touch IC for a touch panel having touch sensing areas arranged in a 32×18 array requires 576 I/O pins, the embodiment of the present invention may reduce the pin number to 73. This significant reduction of pin number leads to tremendous benefits of cost saving and bonding quality improvement.

Figure 13:
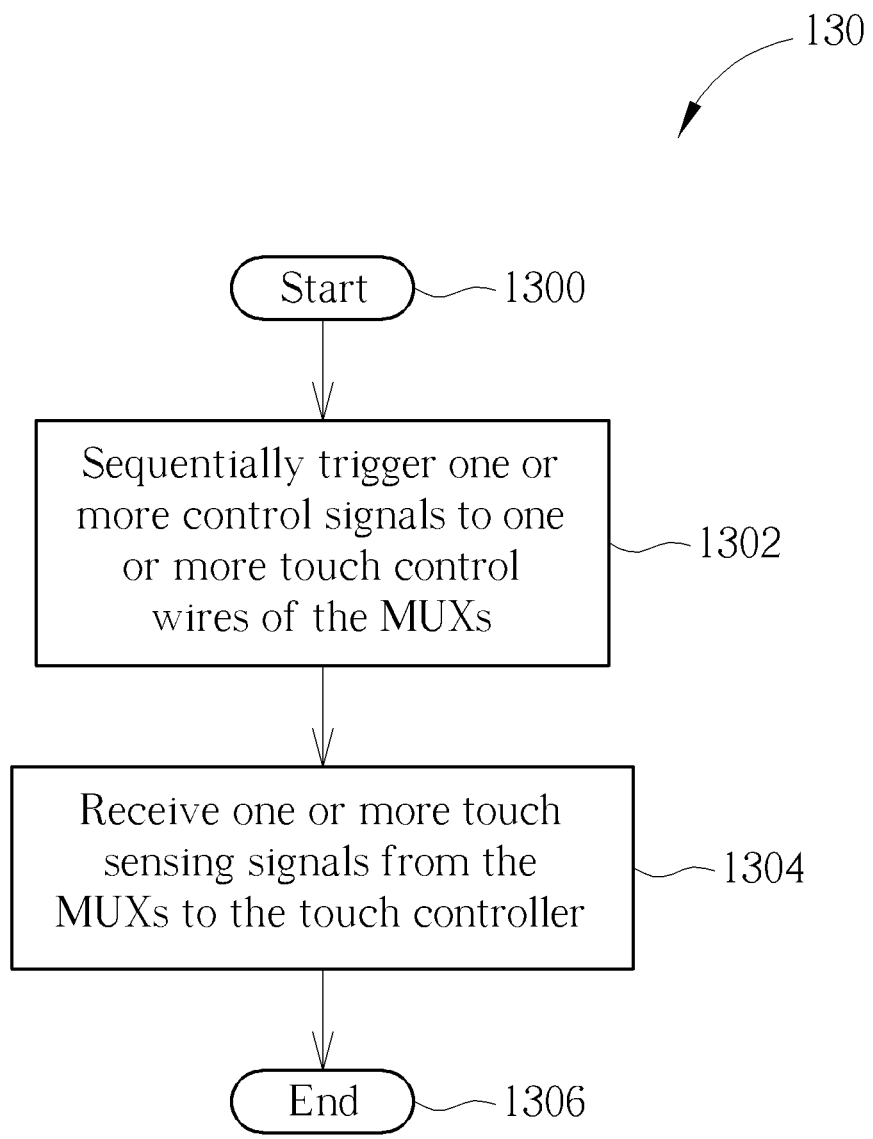
FIG. 13 is a flow chart of a process according to an embodiment of the present invention.

The above mentioned operations of the touch controllers 202 and 1002 may be summarized into a process 130, as shown in FIG. 13. The process 130 may be applied to a touch controller of a touch sensor system having one or more MUXs, for reducing the pin number of the touch controller. The process 130 includes the following steps:

Step 1300: Start.

Step 1302: Sequentially trigger one or more control signals to one or more touch control wires of the MUXs.

Step 1304: Receive one or more touch sensing signals from the MUXs to the touch controller.

Step 1306: End.

The detailed operations and alternations of the process 130 are illustrated in the above descriptions, and will not be narrated hereinafter.

It is noted that the disclosure may be applied to different types of touch sensor systems such as mutual capacitance touch sensor system and self-capacitance touch sensor system. For example, for a mutual capacitance touch sensor system, the connecting wires may include one or both of a first type of connecting wires configured to pass driving signals and a second type of connecting wires configured to pass sensing signals. The driving signals may be coupled to one or more first multiplexers, which may be coupled to the touch controller. Additionally or alternatively, the sensing signals may be coupled to one or more second multiplexers, which may be coupled to the touch controller. In addition, the disclosure may not be limited to touch sensor system but may be applied to other types of sensor system. In other words, the touch panel can be other types of panel such as a finger print panel or a multi-functional panel such as a touch display panel. Furthermore, the touch controller may be replaced with other types of sensor controller such as finger print sensor.

To sum up, the present invention provides a touch sensor system with a MUX disposed between the touch controller and the touch panel, for reducing the pin number of the touch controller. The MUX may be an analog MUX fabricated on the glass substrate of the touch panel with a touch panel process. Therefore, the pin number of the touch controller, which is usually implemented by a touch IC, can be significantly reduced. The reduced pin number decreases the die size of the touch IC, and thereby reduces the cost. With the decreased pin number, there may be more space for the bonding pitch in each I/O pin; this enhances the wire bonding quality of the touch IC. Further, the touch sensor system may include more than one MUX, where at least two columns or two rows of touch sensing areas may undergo touch driving and sensing simultaneously. This increases the speed of touch driving and sensing operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch sensor system, comprising:
   a touch panel, comprising one or more touch sensing areas;
   at least one multiplexer, coupled to the one or more touch sensing areas through one or more connecting wire groups on the touch panel, wherein each of the one or more connecting wire groups comprises one or more connecting wires; and
   a touch controller, coupled to the at least one multiplexer via one or more touch control wires and one or more touch sensing wires;
   wherein each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

2. The touch sensor system of claim 1, wherein the touch controller comprises one or more pins connected to the at least one multiplexer via the one or more touch control wires and the one or more touch sensing wires.

3. The touch sensor system of claim 2, wherein each of the one or more pins is connected to one of the one or more touch control wires or one of the one or more touch sensing wires.

4. The touch sensor system of claim 1, wherein the touch controller is configured to transmit driving signals through each of the one or more touch sensing wires to perform driving on one of the one or more touch sensing areas, and receive sensing signals from the touch sensing area.

5. The touch sensor system of claim 1, wherein the touch controller is configured to control the at least one multiplexer to perform touch driving and sensing on the one or more touch sensing areas in a specific order by triggering the one or more touch control wires in an order.

6. The touch sensor system of claim 1, wherein the touch controller is configured to transmit one of the one or more control signal signals from a same touch control wire among the one or more touch control wires to plural ones of the one or more switches connected to specific touch sensing areas among the one or more touch sensing areas.

7. The touch sensor system of claim 6, wherein the specific touch sensing areas is configured to undergo touch driving and sensing simultaneously.

8. The touch sensor system of claim 1, wherein the at least one multiplexer is fabricated on a glass substrate of the touch panel.

9. The touch sensor system of claim 1, wherein the touch controller is configured to control the at least one multiplexer to perform touch driving and sensing on the one or more touch sensing areas row by row or column by column according to the one or more control signals on the one or more touch control wires.

10. The touch sensor system of claim 9, wherein the touch controller is configured to provide one of the one or more control signals through a same touch control wire among the one or more touch control wires to one or more switches of the at least one multiplexer connected to a same row or a same column of touch sensing areas among the one or more touch sensing areas.

11. The touch sensor system of claim 10, wherein the one or more touch sensing areas are configured to undergo touch driving and sensing row by row or column by column.

12. The touch sensor system of claim 1, wherein the touch controller is configured to control the at least one multiplexer to perform touch driving and sensing on at least two columns of the one or more touch sensing areas simultaneously or at least two rows of the one or more touch sensing areas simultaneously.

13. The touch sensor system of claim 12, wherein the touch controller is configured to trigger the one or more control signals on different touch control wires among the one or more touch control wires simultaneously.

14. The touch sensor system of claim 1, wherein the touch controller is configured to transmit one of the one or more control signal simultaneously to at least two multiplexers among the at least one multiplexer.

15. The touch sensor system of claim 14, wherein the touch controller is configured to perform touch driving and sensing on at least two columns of the one or more touch sensing areas simultaneously or at least two rows of the one or more touch sensing areas simultaneously.

16. A multiplexer used in a touch sensor system, wherein the multiplexer is coupleable to a touch controller via one or more touch control wires and one or more touch sensing wires, and the multiplexer is coupleable to a touch panel through one or more connecting wire groups, each of the one or more connecting wire groups comprising one or more connecting wires, the multiplexer comprising:
 one or more switch groups each coupled between one of the touch sensing wires and one of the one or more connecting wire groups, each of the switch groups comprising:
  one or more switches, each of which comprising:
   a first connection terminal, coupled to the touch controller via one of the one or more touch sensing wires;
   a second connection terminal, coupled to the touch panel, the touch panel comprising one or more touch sensing areas; and
   a control terminal, coupled to one of the one or more touch control wires, for receiving one of one or more control signals from the touch controller;
 wherein the one or more switches in each of the switch groups are respectively controlled by one or more control signals transmitted through the touch control wires.

17. A multiplexer used in a touch sensor system, wherein the multiplexer is coupleable to a touch controller via one or more touch control wires and one or more touch sensing wires, and the multiplexer is coupleable to a touch panel through one or more connecting wire groups, each of the one or more connecting wire groups comprising one or more connecting wires, the multiplexer comprising:
 one or more switch groups each coupled between one of the touch sensing wires and one of the one or more connecting wire groups, each of the switch groups comprising:
  one or more switches, each of which comprising:
   a first connection terminal, coupled to the touch controller via one of the one or more touch sensing wires;
   a second connection terminal, coupled to the touch panel, the touch panel comprising one or more touch sensing areas; and
   a control terminal, coupled to one of the one or more touch control wires, for receiving one of one or more control signals from the touch controller.

18. The multiplexer of claim 17, wherein the one or more switches in each of the switch groups are respectively controlled by the one or more control signals transmitted through the touch control wires.

19. A touch sensor device, comprising:
 at least one multiplexer, configured to be coupled to one or more touch sensing areas of a touch panel through one or more connecting wire groups on the touch panel, wherein each of the one or more connecting wire groups comprises one or more connecting wires; and
 a touch controller, configured to be coupled to the at least one multiplexer via one or more touch control wires and one or more touch sensing wires;
 wherein each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

20. The touch sensor device of claim 19, wherein the touch controller comprises one or more pins connected to the at least one multiplexer via the one or more touch control wires and the one or more touch sensing wires.

21. The touch sensor device of claim 20, wherein each of the one or more pins is connected to one of the one or more touch control wires or one of the one or more touch sensing wires.

22. A touch panel apparatus, configured to be controlled by a touch controller, comprising:
 a touch panel, comprising one or more touch sensing areas; and
 at least one multiplexer, coupled to the one or more touch sensing areas through one or more connecting wire groups on the touch panel, wherein each of the one or more connecting wire groups comprises one or more connecting wires;
 wherein each of the at least one multiplexer comprises one or more switch groups each coupled between one of the one or more touch sensing wires and one of the one or more connecting wire groups, and each of the switch groups comprises one or more switches respectively controlled by one or more control signals transmitted through the one or more touch control wires.

23. A touch controller, configured to control a touch panel apparatus, the touch panel apparatus comprising a touch panel comprising one or more touch sensing areas, and at least one multiplexer coupled to the one or more touch sensing areas through one or more connecting wire groups on the touch panel, wherein each of the one or more connecting wire groups comprises one or more connecting wires, and each of the at least one multiplexer comprises one or more switch groups each coupled between one of the one or more touch sensing wires and one of the one or more connecting wire groups, wherein the touch controller comprises:
 one or more pins connected to the at least one multiplexer via one or more touch control wires and one or more touch sensing wires; and
 control logic providing one or more control signals configured to be transmitted through the one of more touch control wires to respectively control one or more switches in each of the switch groups.

24. The touch controller of claim 23, wherein the touch controller is configured to transmit driving signals through each of the one or more touch sensing wires to perform driving on one of the one or more touch sensing areas, and receive sensing signals from the touch sensing area.

25. The touch controller of claim 23, wherein the touch controller is configured to control the at least one multiplexer to perform touch driving and sensing on the one or more touch sensing areas in a specific order by triggering the one or more touch control wires in an order.

26. The touch controller of claim 23, wherein the touch controller is configured to transmit one of the one or more control signal signals from a same touch control wire among the one or more touch control wires to plural ones of the one or more switches connected to specific touch sensing areas among the one or more touch sensing areas.

27. The touch controller of claim 26, wherein n the touch controller is configured to control the touch panel apparatus such that the specific touch sensing areas undergoes touch driving and sensing simultaneously.

28. The touch controller of claim 27, wherein the at least one multiplexer is fabricated on a glass substrate of the touch panel.

29. The touch controller of claim 23, wherein the touch controller is configured to control the at least one multiplexer to perform touch driving and sensing on the one or more touch sensing areas row by row or column by column according to the one or more control signals on the one or more touch control wires.

30. The touch controller of claim 29, wherein the touch controller is configured to provide one of the one or more control signals through a same touch control wire among the one or more touch control wires to one or more switches of the at least one multiplexer connected to a same row or a same column of touch sensing areas among the one or more touch sensing areas.

31. The touch controller of claim 30, wherein the touch controller is configured to control the touch panel apparatus such that the one or more touch sensing areas undergo touch driving and sensing row by row or column by column.

32. The touch controller of claim 23, wherein the touch controller is configured to control the at least one multiplexer to perform touch driving and sensing on at least two columns of the one or more touch sensing areas simultaneously or at least two rows of the one or more touch sensing areas simultaneously.

33. The touch controller of claim 32, wherein the touch controller is configured to trigger the one or more control signals on different touch control wires among the one or more touch control wires simultaneously.

34. The touch controller of claim 23, wherein the touch controller is configured to transmit one of the one or more control signal simultaneously to at least two multiplexers among the at least one multiplexer.

35. The touch controller of claim 34, wherein the touch controller is configured to perform touch driving and sensing on at least two columns of the one or more touch sensing areas simultaneously or at least two rows of the one or more touch sensing areas simultaneously.

* * * * *